Figure 1:
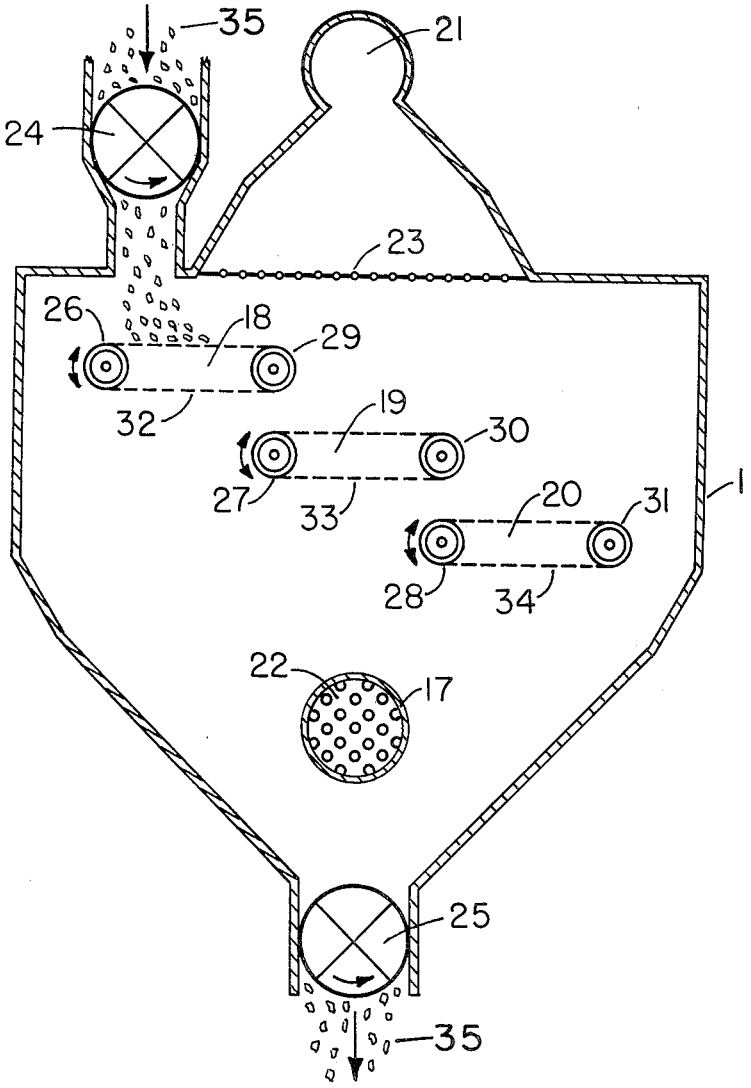
Figure 2:
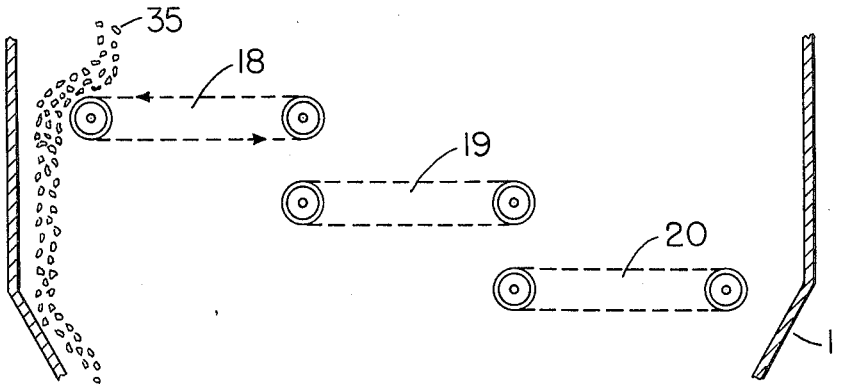
Figure 3:
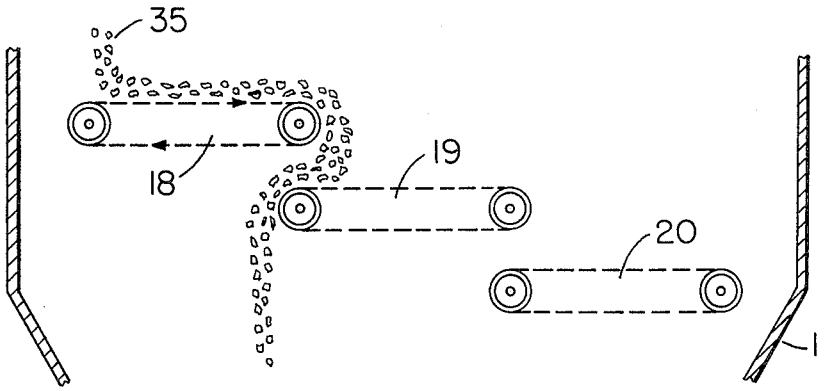
Figure 4:
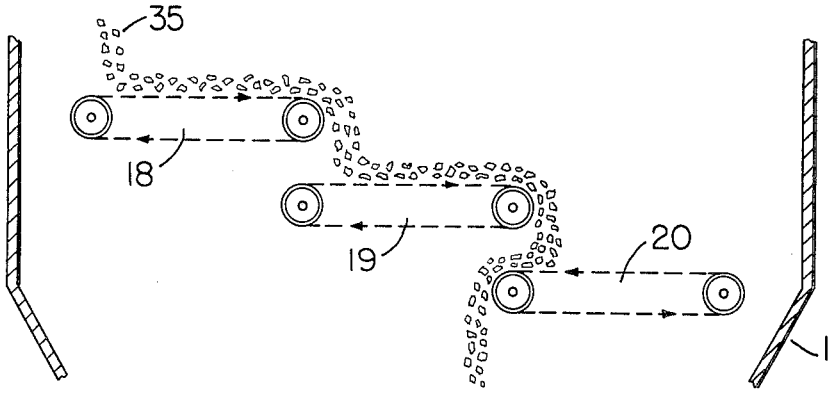
Figure 5:
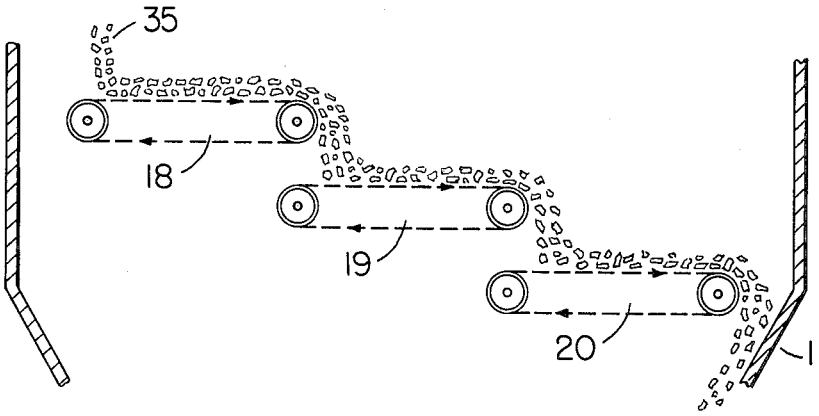
Figure 6:
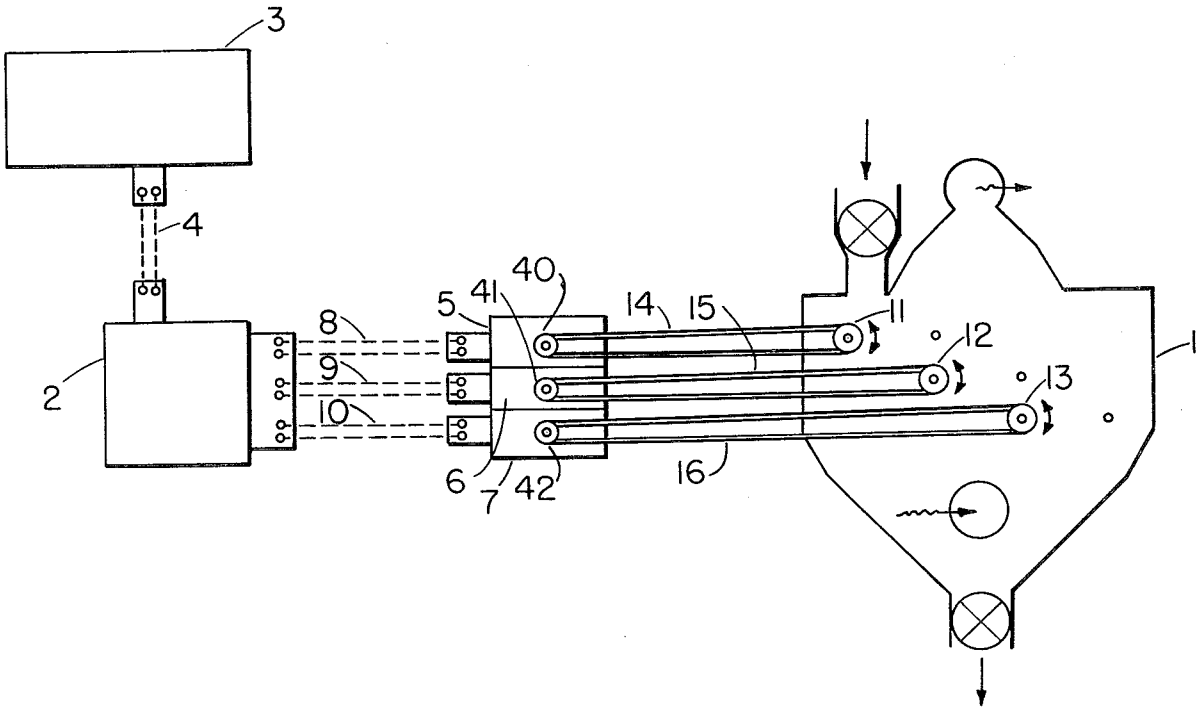

United States Defensive Publication [19] (H) [11] T975,001

Mangialardi, Jr. et al. [43] Oct. 3, 1978

[54] APPARATUS FOR CONDITIONING SEED COTTON

[75] Inventors: Gino J. Mangialardi, Jr., Greenville; Anselm C. Griffin, Jr., Leland, both of Miss.

[73] Assignee: The United States of America as represented by the Secretary of Agriculture, Washington, D.C.

[21] Appl. No.: 846,478

[22] Filed: Oct. 28, 1977

[51] Int. Cl.[2] ..... D01B 9/00

[52] U.S. Cl. ..... 19/66 CC

[57] ABSTRACT

An apparatus for conditioning seed cotton during the ginning operation is disclosed. Seed cotton which is to be conditioned to a proper moisture content is fed through a rotating vacuum seal dropper onto a series of moving belts located within a conditioning chamber. The moving belts are arranged to retain the seed cotton for a predetermined critical period within the chamber. Conditioned air is circulated through the chamber and brought into intimate contact with the seed cotton thereby properly adjusting the moisture content. The seed cotton is then vented through a rotating vacuum seal dropper into gin processing equipment.

14 Claims, 4 Sheets Drawing,

16 Pages Specification

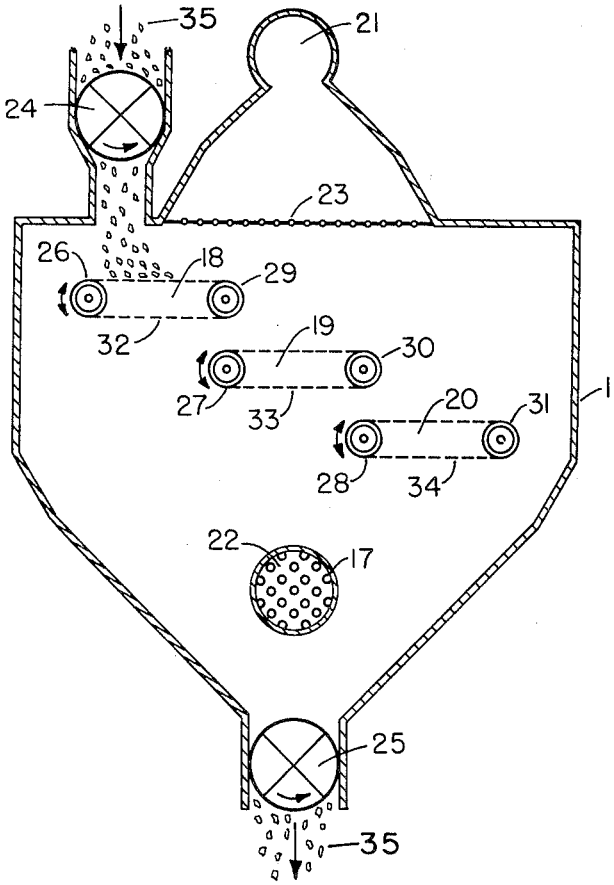

The file of this unexamined application may be inspected and copies thereof may be purchased (849 O.G. 1221, Apr. 9, 1968).